(12) United States Patent
Hara

(10) Patent No.: US 12,149,659 B2
(45) Date of Patent: Nov. 19, 2024

(54) IMAGE FORMING APPARATUS

(71) Applicant: KYOCERA Document Solutions Inc., Osaka (JP)

(72) Inventor: Nobuhiro Hara, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 18/541,466

(22) Filed: Dec. 15, 2023

(65) Prior Publication Data

US 2024/0214494 A1    Jun. 27, 2024

(30) Foreign Application Priority Data

Dec. 27, 2022  (JP) .................. 2022-209795

(51) Int. Cl.
| | |
|---|---|
| *H04N 1/04* | (2006.01) |
| *G06T 7/00* | (2017.01) |
| *G06T 7/60* | (2017.01) |
| *H04N 1/00* | (2006.01) |

(52) U.S. Cl.
CPC ......... *H04N 1/00045* (2013.01); *G06T 7/001* (2013.01); *G06T 7/60* (2013.01); *H04N 1/00005* (2013.01); *H04N 1/00015* (2013.01); *G06T 2207/10024* (2013.01); *G06T 2207/30144* (2013.01)

(58) Field of Classification Search
USPC ....................... 358/3.26, 504, 406
See application file for complete search history.

(56) References Cited

U.S. PATENT DOCUMENTS 9,170,543 B2 *  10/2015  Arakawa ............... G06T 7/001

FOREIGN PATENT DOCUMENTS

| JP | 2007-033247 | 2/2007 |
|---|---|---|
| JP | 2014-134401 | 7/2014 |
| JP | 2018-044896 | 3/2018 |

* cited by examiner

*Primary Examiner* — Cheukfan Lee

(57) ABSTRACT

A print image generation unit performs a first rasterization process for printing and thereby generates print image data. A print unit performs printing based on the print image data and thereby produces a print product. An image scanning unit performs image scanning of the print product and thereby generates scan image data. Further, the print image generation unit performs a second rasterization process for inspection and generates reference image data of plural reference images that have plural slant angles in a predetermined range, respectively; and an inspection processing unit determines a skew angle of the scan image data, selects a reference image corresponding to the slant angle among the plural reference images, and compares the reference image data of the selected reference image and the scan image data and thereby performs inspection of the print product.

5 Claims, 4 Drawing Sheets

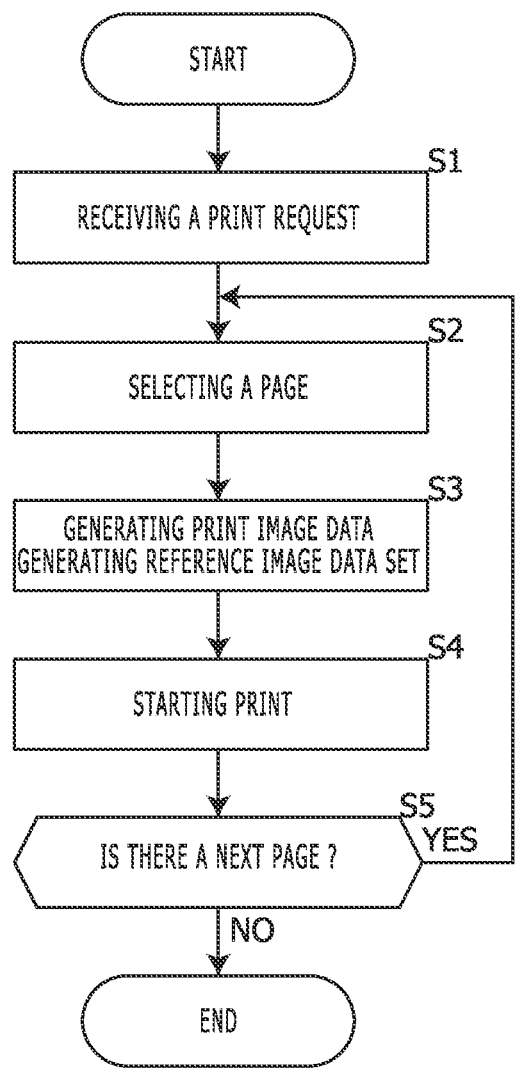

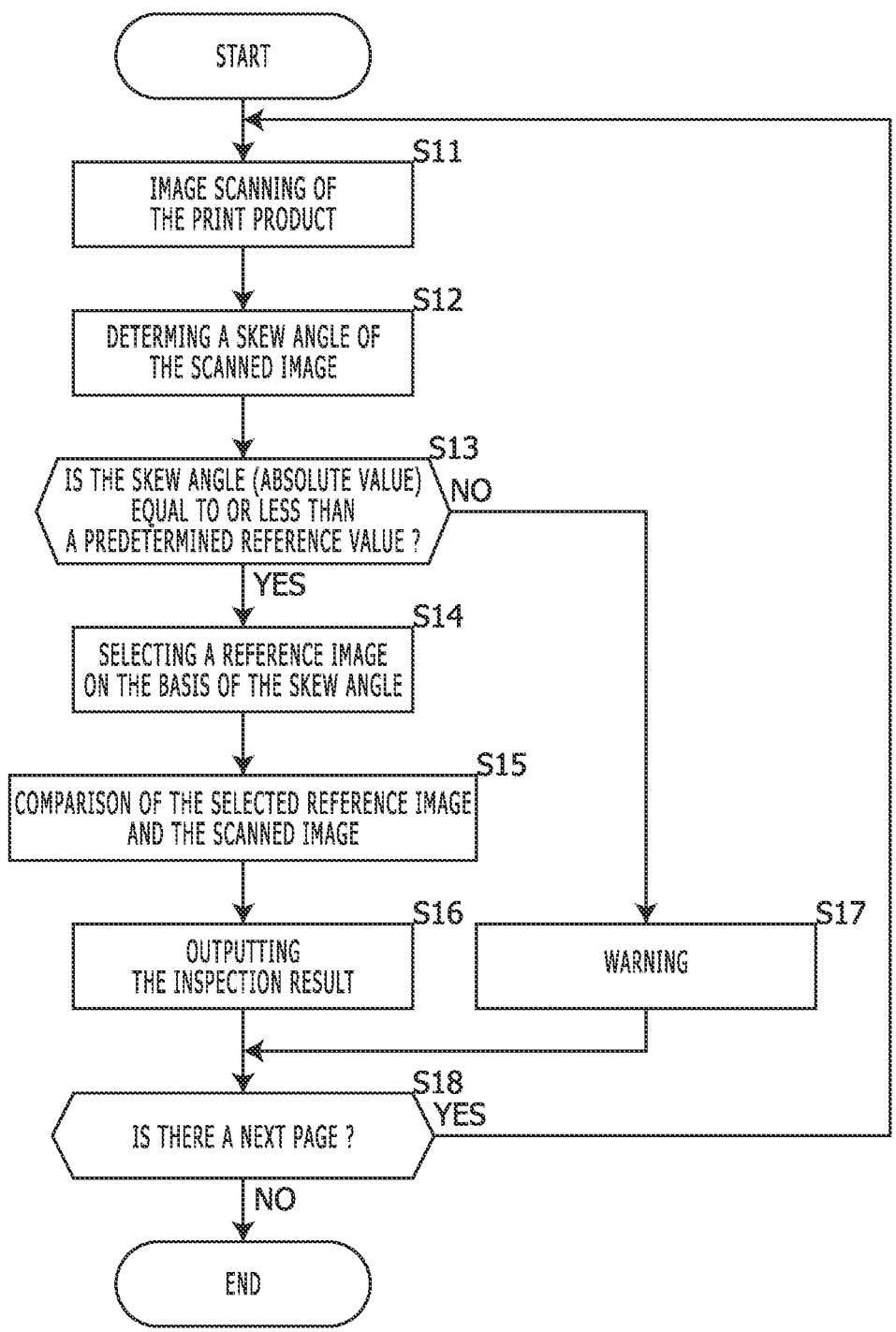

IMAGE FORMING APPARATUS

CROSS-REFERENCE TO RELATED APPLICATIONS

This application relates to and claims priority rights from Japanese Patent Application No. 2022-209795, filed on Dec. 27, 2022, the entire disclosures of which are hereby incorporated by reference herein.

BACKGROUND

1. Field of the Present Disclosure

The present disclosure relates to an image forming apparatus.

2. Description of the Related Art

Regarding a printed matter printed in a printing condition on the basis of a master image created by DTP, an inspection method compares an image obtained by scanning the printed matter with a scanning characteristic and an image obtained by correcting the master image with the printing condition and the scanning condition, and thereby checks the printed matter.

An inspection system (a) generates print data of CMYK from correct image data in a Lab space after rasterization, performs printing based on the print data, and thereby produces a printed matter, (c) converts a RGB image obtained by scanning the printed matter to an image in the Lab space, and (d) compares the correct image data in the Lab space and the image of the printed matter in the Lab space and thereby performs inspection.

An inspection apparatus compares an image obtained by performing halftoning and the like for an original image after rasterization and an RGB image obtained by scanning a printed matter on which the original image has been printed and thereby performs inspection.

When comparing a scanned image of a printed matter and a reference image as the aforementioned technique, if a skew occurs in the scanned image, a correct comparison between these images is difficult, and therefore, after skew correction (image rotation) is performed of the scanned image or the reference image, these images are compared.

However, when the inspection is performed as mentioned, the scanned image or the reference image deteriorates due to the skew correction (image rotation) performed for the scanned image or the reference image, and thereby it is difficult to perform inspection of a print product with a high inspection precision.

SUMMARY

An image forming apparatus according to an aspect of the present disclosure includes a print image generation unit, a print unit, an image scanning unit, and an inspection processing unit. The print image generation unit is configured to perform a first rasterization process for printing and thereby generate print image data, on the basis of a print request. The print unit is configured to perform printing based on the print image data onto a print paper sheet and thereby produce a print product. The image scanning unit is configured to perform image scanning of the print product and thereby generate scan image data. The inspection processing unit is configured to perform inspection of the print product. Further, the print image generation unit performs a second rasterization process for inspection on the basis of the print request and generates reference image data of plural reference images that have plural slant angles in a predetermined range, respectively; and the inspection processing unit (a) determines a skew angle of the scan image data, (b) selects a reference image corresponding to the skew angle among the plural reference images, and (c) compares the reference image data of the selected reference image and the scan image data and thereby performs inspection of the print product.

These and other objects, features and advantages of the present disclosure will become more apparent upon reading of the following detailed description along with the accompanied drawings.

BRIEF DESCRIPTION OF THE DRAWINGS

FIG. 3 shows a flowchart that explains a rasterization process and printing of the image forming apparatus 1 shown in FIG. 1; and FIG. 4 shows a flowchart that explains an inspection process of the image forming apparatus 1 shown in FIG. 1.

DETAILED DESCRIPTION

Hereinafter, an embodiment according to an aspect of the present disclosure will be explained with reference to drawings.

Figure 1:
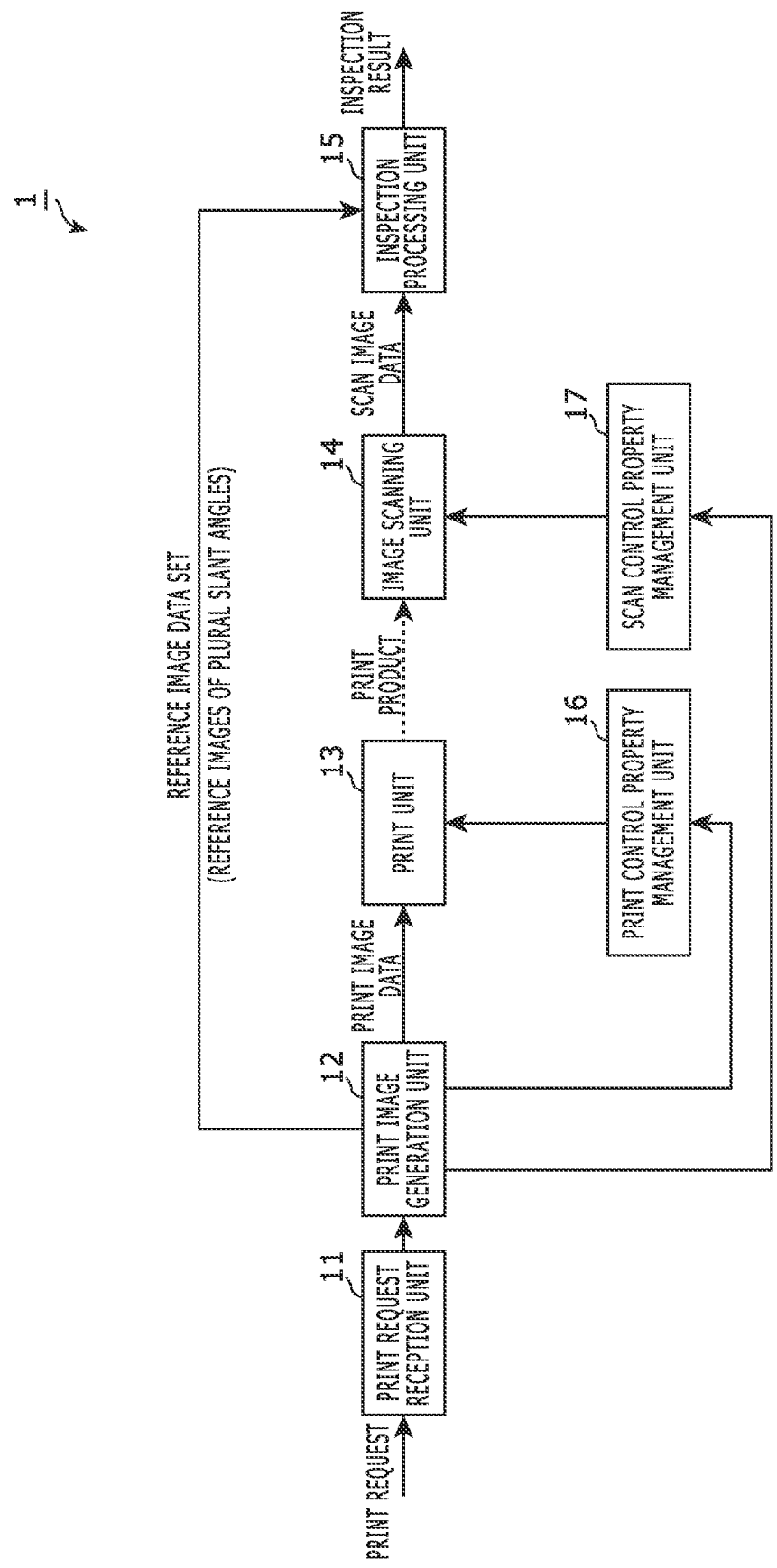
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus 1 shown in FIG. 1 is an apparatus having a printing function such as a printer or a multi function peripheral. The image forming apparatus 1 includes a print request reception unit 11, a print image generation unit 12, a print unit 13, an image scanning unit 14, an inspection processing unit 15, a print control property management unit 16, and a scan control property management unit 17.

The image forming apparatus 1 includes a communication device, an input device, a computer, an ASIC (Application Specific Integrated Circuit), and the like, and acts as the print request reception unit 11, the inspection processing unit 15, the print control property management unit 16, and the scan control property management unit 17 by causing the computer to execute a program.

The print unit 13 performs printing based on print image data onto a print paper sheet using a colorant such as ink or toner according to a predetermined print manner such as electrophotographic manner or inkjet manner, and thereby generates a print product.

The image scanning unit 14 performs optical image scanning of the print product and thereby generates scan image data. For example, the image scanning unit 14 is a line image sensor that is installed in a post stage of the print unit 13 and scans an image of a print paper sheet incoming from the print unit 13.

The print request reception unit 11 receives a print request. The print request is transmitted from an external device and received through a communication device, or is obtained from an input device in accordance with a user operation. The print request includes image information described in a page description language (PDF, LIPS or the like) and a print property information. The print property information includes (a) a print paper sheet type, a print paper sheet size, a color temperature and a chromogenic characteristic of a print paper sheet to be used for printing, (b) an output property (resolution of printing, color setting (color or monochrome), color conversion setting, halftoning type, duplex printing setting and the like), and (c) an inspection property (resolution of the reference image data or the like).

The print image generation unit 12 performs a first rasterization process for printing and thereby generates print image data, and performs a second rasterization process for inspection and thereby generates reference image data, on the basis of the aforementioned print request. The print image generation unit 12 is formed by the aforementioned computer, ASIC and/or the like. The print image data includes image planes of colors of a color space of colorant (here, Cyan, Magenta, Yellow, and Black, or the like) used in the print unit 13. The reference image data includes image planes of colors of a color space same as the color space (here, RGB, that is different from a color space of the print image data) of the image data generated by the image scanning unit 14.

Specifically, the print image generation unit 12 performs a second rasterization process for inspection on the basis of the print request and generates reference image data of plural reference images that have plural slant angles (rotation angles) in a predetermined range, respectively.

The aforementioned predetermined range is set correspondingly to a range of a skew angle mentioned below, for example is set as a range from +5 degrees to −5 degrees. Further, plural reference images corresponding to plural slant angles set as every 0.1 degree in this range are directly generated by the second rasterization process (i.e. without image rotation).

Figure 2:
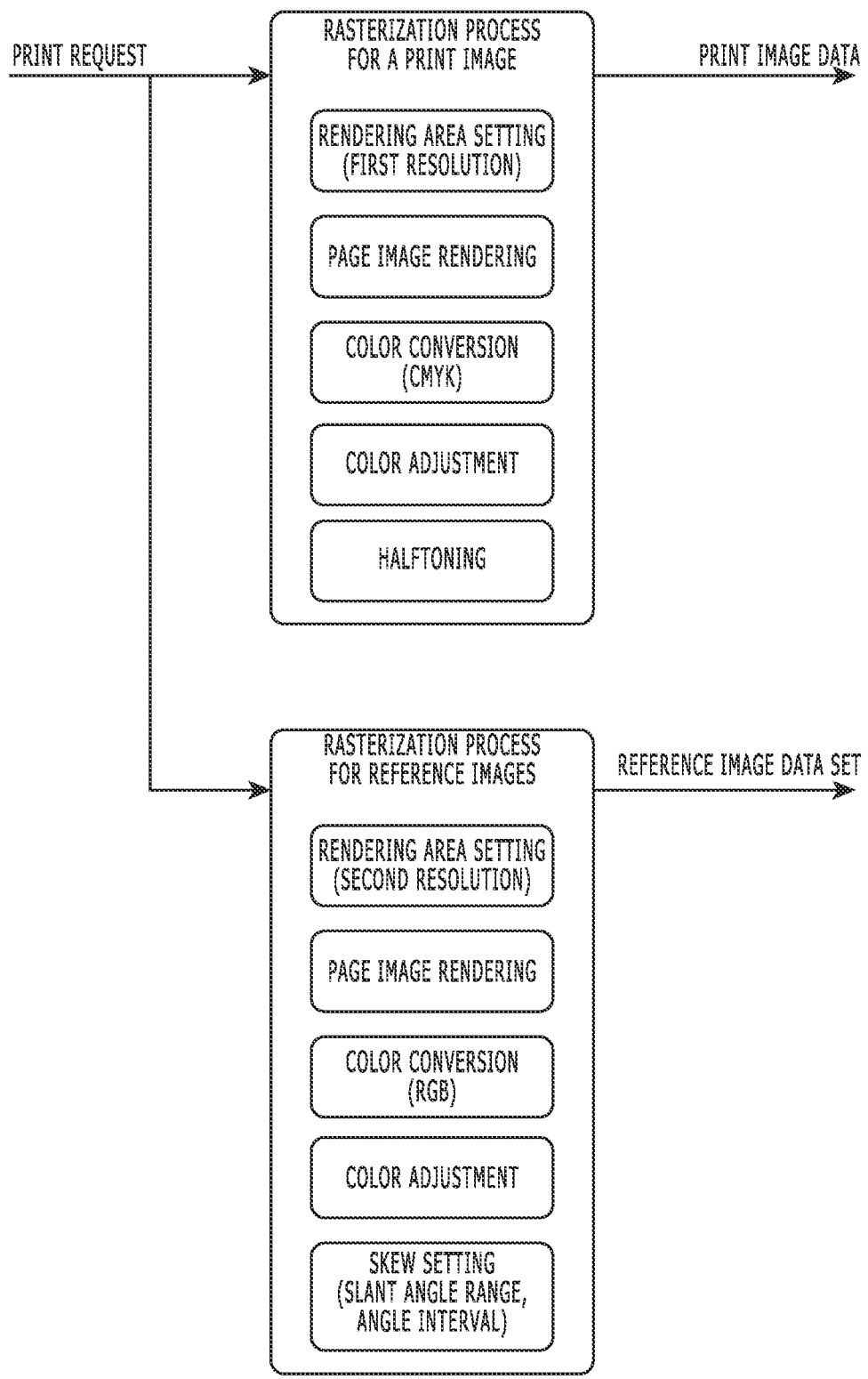
FIG. 2 shows a diagram that explains a behavior of a print image generation unit 12 in FIG. 1.

In the print image generation unit 12, the second rasterization process is a rasterization process performed in a rendering condition different from a rendering condition of the first rasterization process. In these rasterization process, raster image data (print image data) based on the image information described in a page description language is generated in accordance with this rendering condition. FIG. 2 shows a diagram that explains a behavior of a print image generation unit 12 in FIG. 1. As shown in FIG. 2, this rendering condition includes at least one of resolution, color space after color conversion, and color adjustment characteristic (here, includes all of them). A resolution in the second rasterization process is less than a resolution in the first rasterization process. For example, a resolution in the first rasterization process is 600 dpi or 1200 dpi and a resolution in the second rasterization process is 200 dpi.

Further, the second rasterization process may be performed on the basis of a chromogenic characteristic of colorant on the aforementioned print paper sheet. Specifically, on the basis of a difference between a colorimetry result of a print paper sheet as reference on which colorant has been attached and a colorimetry result of a print paper sheet used for printing on which the colorant has been attached, a pixel value of the image to be generated is adjusted. The aforementioned colorimetry result is acquired and stored in a storage device (not shown) in advance, and read and used when needed.

Further, the second rasterization process may be performed on the basis of a color temperature of the print paper sheet. Specifically, on the basis of a difference between a color temperature of a print paper sheet as reference and a color temperature of a print paper sheet used for printing, a pixel value of the image to be generated is adjusted. Regarding the aforementioned color temperature, data of the aforementioned color temperature is acquired and stored in a storage device (not shown) in advance, and read and used when needed.

The inspection processing unit 15 performs inspection of the print product on the basis of the aforementioned scan image data. The inspection processing unit 15 (a) determines a skew angle of the scan image data, (b) selects a reference image corresponding to the skew angle among the plural reference images, and (c) compares the reference image data of the selected reference image and the scan image data and thereby performs inspection of the print product. Here, the skew angle is detected by detecting an edge image corresponding to an edge of the print product in an image (scan image) based on the scan image data and identifying a slant angle of the edge image (i.e. a slant angle from a primary scanning direction or a secondary scanning direction) as the skew angle.

Specifically, the inspection processing unit 15 generates a difference between the aforementioned scan image data and the reference image data of the selected reference image (e.g. a difference of pixel values at each pixel position, or the like), and determines a quality of the print product on the basis of this difference. In this inspection, other than the comparison of the aforementioned images, the aforementioned print property information may be taken into account. In addition, as a method of the determination of a quality of the print product, an existent other method may be used.

Further, in this embodiment, (a) if the determined skew angle is in the predetermined range, the inspection processing unit 15 selects the reference image of the slant angle nearest to the skew angle among the plural reference images, compares the reference image data of the selected reference image and the scan image data, and thereby performs inspection of the print product, and (b) if the determined skew angle is out of the predetermined range, the inspection processing unit 15 does not perform inspection of the print product.

The print control property management unit 16 acquires the aforementioned output property from the print image generation unit 12 and sets it to the print unit 13. The scan control property management unit 17 acquires the aforementioned inspection property from the print image generation unit 12 and sets a resolution and the like in the inspection property to the image scanning unit 14.

The following part explains a behavior of the aforementioned image forming apparatus.

(a) Rasterization Process and Printing

FIG. 3 shows a flowchart that explains a rasterization process and printing of the image forming apparatus 1 shown in FIG. 1.

A user operates this image forming apparatus 1 or an external device and thereby creates a print request. The print request reception unit 11 receives the print request (in Step S1).

Upon receiving the print request, the print image generation unit 12 selects a page for which the first and second rasterization processes should be performed (in Step S2), performs the first and second rasterization processes for this page as mentioned and thereby generates print image data and a reference image data set of reference images of plural slant angles, and provides the print image data to the print unit 13 and provides the reference image data set to the inspection processing unit 15 (in Step S3).

Upon generating the print image data of this page, the print unit 13 starts printing of an image based on the print image data (in Step S4). The print unit 13 performs the printing and thereby produces and outputs a print product.

Upon generating the print image data of this page, if there is a next page (in Step S5), the print image generation unit 12 selects the next page, and the process in Step S3 and subsequent processes are performed as well for this page; and if there is not a next page (in Step S5), the rasterization process and the printing are terminated.

As mentioned, for each page, a print product is outputted and the reference image data set (reference images of plural slant angles) is generated.

(b) Inspection Process

FIG. 4 shows a flowchart that explains an inspection process of the image forming apparatus 1 shown in FIG. 1.

Upon a print product of a page is produced as mentioned, the print product is transported from the print unit 13 to the image scanning unit 14, and the image scanning unit 14 performs image scanning of the print product and thereby generates scan image data (in Step S11).

Upon generating scan image data of a page, the inspection processing unit 15 determines a skew angle of this scan image data (in Step S12), and determines whether an absolute value of the skew angle is equal to or less than a predetermined reference value or not (in Step S13).

If the absolute value of the skew angle is equal to or less than the predetermined reference value, the inspection processing unit 15 selects a reference image (reference image data of it) corresponding to the skew angle (in Step S14), and compares the selected reference image (reference image data of it) and the scan image (the scan image data) with each other (in Step S15).

On the basis of this comparison result, the inspection processing unit 15 determines and outputs a quality of the print product as an inspection result (in Step S16).

Contrarily, if the absolute value of the skew angle exceeds the predetermined reference value, the inspection processing unit 15 performs warning (outputting a warning message or the like) (in Step S17), and does not perform inspection of a print product of this page.

Subsequently, upon the process for this page is terminated, if there is a next page (in Step S18), the inspection processing unit 15 performs the process in Step S11 and subsequent processes as well for the next page; and if there is not a next page (in Step S18), the inspection process is terminated.

Here, for example, the inspection processing unit 15 may select an output destination of the print product in accordance with this inspection result. For example, if the inspection result indicates a good quality, the inspection processing unit 15 outputs the print product to a default output tray, and if the inspection result indicates a bad quality, the inspection processing unit 15 outputs the print product to a purge tray other than the default output tray. In addition, when the warning is outputted in Step S17, the print product is also outputted to this purge tray.

As mentioned, in the aforementioned embodiment, the print image generation unit 12 performs a first rasterization process for printing and thereby generates print image data, on the basis of a print request. The print unit 13 performs printing based on the print image data onto a print paper sheet and thereby produces a print product. The image scanning unit 14 performs image scanning of the print product and thereby generates scan image data. Further, the print image generation unit 12 performs a second rasterization process for inspection on the basis of the print request and generates reference image data of plural reference images that have plural slant angles in a predetermined range, respectively; and the inspection processing unit 15 (a) determines a skew angle of the aforementioned scan image data, (b) selects a reference image corresponding to the skew angle among the aforementioned plural reference images, and (c) compares the reference image data of the selected reference image and the aforementioned scan image data and thereby performs inspection of the print product.

Consequently, without skew correction and without generating from the print image data the reference image data, the reference image data corresponding to a property (resolution or the like) of the scan image data is generated by the rasterization process, and therefore inspection of the print product is performed with a high inspection precision. Specifically, an image process (resolution conversion or the like) from the print image data to the reference image data and skew correction are not performed, and consequently, the reference image data has a high image quality, and a high inspection precision is obtained.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
 a print image generation unit configured to perform a first rasterization process for printing and thereby generate print image data, on the basis of a print request;
 a print unit configured to perform printing based on the print image data onto a print paper sheet and thereby produce a print product;
 an image scanning unit configured to perform image scanning of the print product and thereby generate scan image data; and
 an inspection processing unit configured to perform inspection of the print product;
 wherein the print image generation unit performs a second rasterization process for inspection on the basis of the print request and generates reference image data of plural reference images that have plural slant angles in a predetermined range, respectively; and
 the inspection processing unit (a) determines a skew angle of the scan image data, (b) selects a reference image corresponding to the skew angle among the plural reference images, and (c) compares the reference image data of the selected reference image and the scan image data and thereby performs inspection of the print product.

2. The image forming apparatus according to claim 1, wherein (a) if the skew angle is in the predetermined range, the inspection processing unit selects the reference image of the slant angle nearest to the skew angle among the plural reference images, compares the reference image data of the selected reference image and the scan image data, and thereby performs inspection of the print product, and (b) if the skew angle is out of the predetermined range, the inspection processing unit does not perform inspection of the print product.

3. The image forming apparatus according to claim 1, wherein the second rasterization process is a rasterization process performed in a rendering condition different from a rendering condition of the first rasterization process, and the rendering condition includes at least one of resolution, color space after color conversion, and color adjustment characteristic.

4. The image forming apparatus according to claim 1, wherein the second rasterization process is performed on the basis of a chromogenic characteristic of colorant on the print paper sheet.

5. The image forming apparatus according to claim 1, wherein the second rasterization process is performed on the basis of a color temperature the print paper sheet.

* * * * *